Nov. 29, 1966     F. FLOER     3,288,201
HYDRAULICALLY CONTROLLED HATCH HINGES
Filed Oct. 1, 1963     2 Sheets-Sheet 1
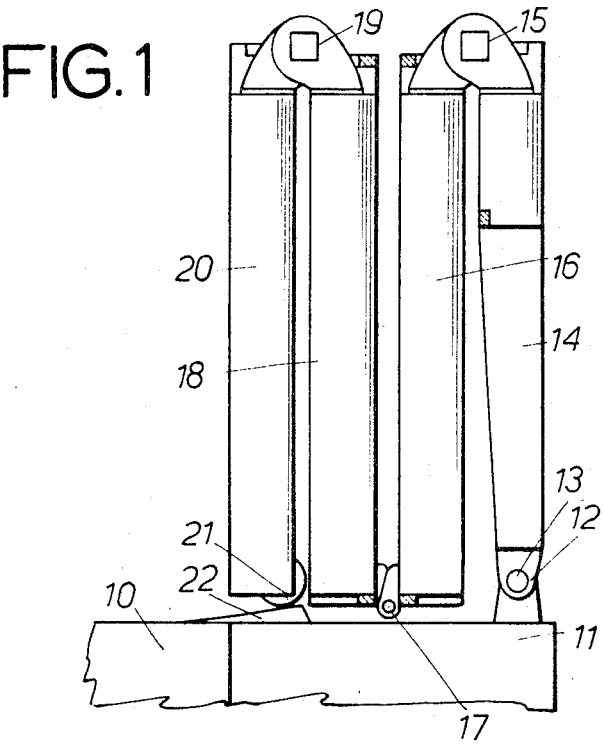
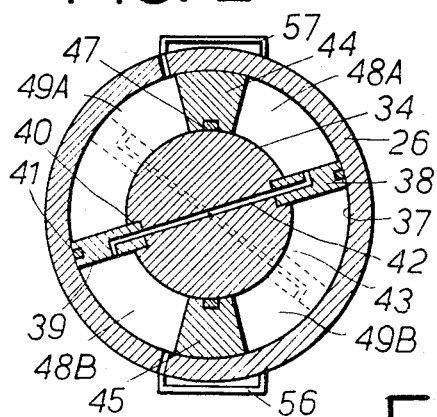
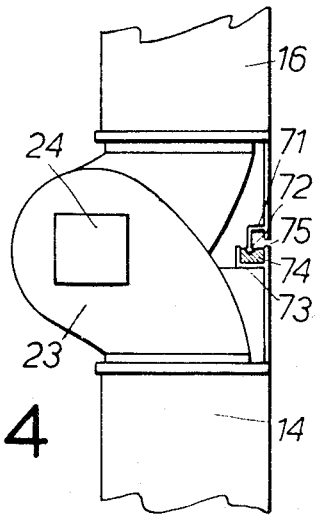
INVENTOR:
FINN FLOER.
BY
Irving Seidman
ATTORNEY.

Nov. 29, 1966 F. FLOER 3,288,201
HYDRAULICALLY CONTROLLED HATCH HINGES
Filed Oct. 1, 1963 2 Sheets-Sheet 2
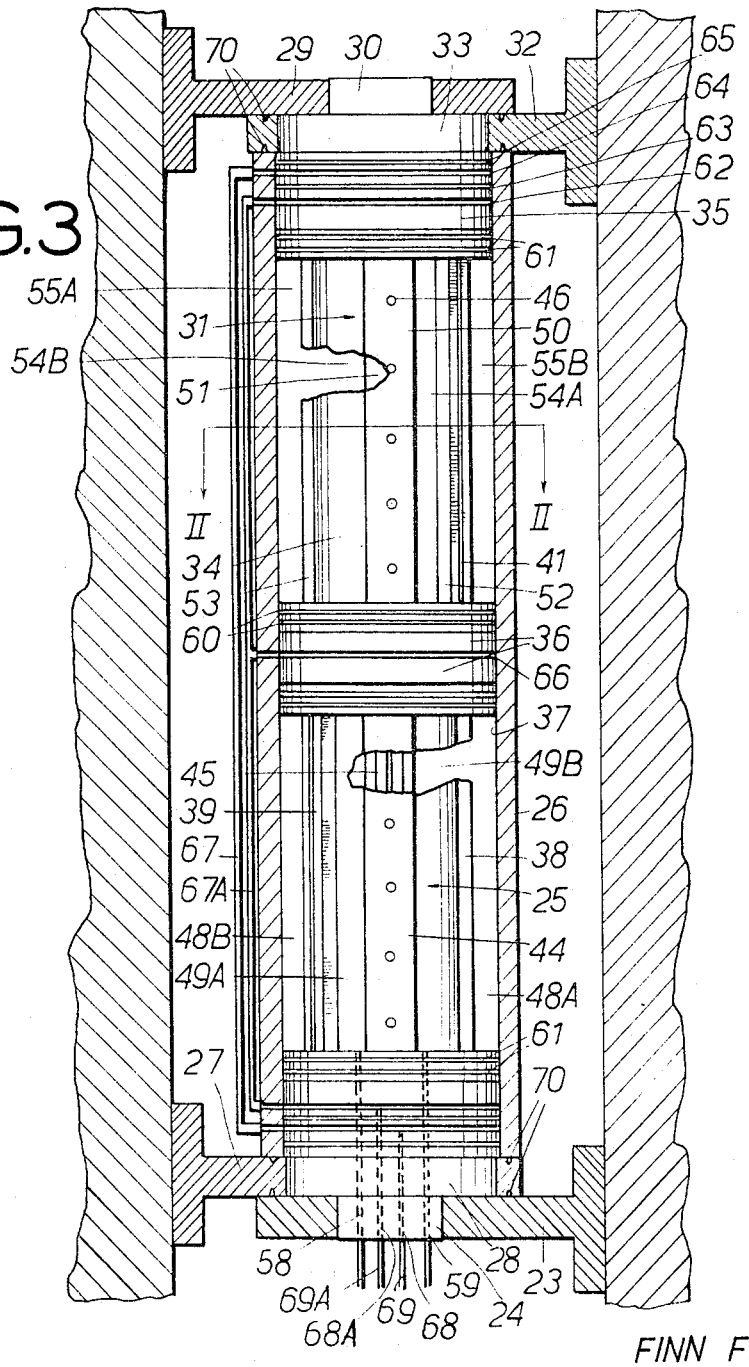
INVENTOR:
FINN FLOER.
BY
Irving Seidman
ATTORNEY.

United States Patent Office 3,288,201
Patented Nov. 29, 1966

3,288,201
HYDRAULICALLY CONTROLLED
HATCH HINGES
Finn Floer, Fana, Norway, assignor to A/S Bergens
Mekaniske Verksteder, Bergen, Norway
Filed Oct. 1, 1963, Ser. No. 312,993
Claims priority, application Norway, Oct. 27, 1962,
146,247
7 Claims. (Cl. 160—188)

This invention relates to hydraulically controlled hatch hinges, especially for ships' hatches, together with a motor for use with such hatch hinges.

In the case of the larger ships' hatches, the hatch covers must be divided up into a number of sections, all according to the size of the hatch. It has previously been proposed to pivot such hatch cover sections hydraulically by means of reciprocating hydraulic motors. However, when one has more than four sections, which occurs very often in larger ships, the conventional reciprocating hydraulic motors having radial blades cannot be used, since these normally do not give more than about a 140° turning angle. Certain reciprocating hydraulic-mechanical motors have been proposed, in which an axial piston is caused to move along a screw thread so as to drive a shaft journal, whereby it has been possible to obtain pivoting of 180° or more, but such special constructions have been expensive to produce and there has been a not unsubstantial loss of power in the transmission to the screw threads.

An object of the present invention is to provide a construction for a hatch cover, wherein the movements in the hinges are purely rotary movements, but despite this pivoting of the sections through 180° can be obtained.

A further object of the invention is the provision of an oscillating hydraulic motor which in spite of the fact that the movements of the parts of the motor are exclusively rotary movements, is able to pivot quite a number of degrees more than 180° in relation to a second part.

The invention consists in a hydraulically controllable hatch hinge of the kind wherein two cover sections are linked together by an oscillating hydraulically controlled motor whose rotation causes the one section to pivot about the hinge in relation to the second section, wherein the one section is secured to a first rotor while the other section is secured to a second rotor, the two rotors being axially immovably received but radially rotatable each relative to its respective part of a housing which parts are fixedly connected to each other but arranged so as to be rotatable relative to both the two sections.

Preferably, the two housing parts together form a single common housing for the two rotors.

The oscillating motor of the present invention is of the kind wherein there is arranged in a bore in a housing a rotor having radially directed blades which are each received in their respective chambers defined by separating walls extending from the inner wall of the bore and inwards to the core of the shaft of the rotor, and each blade thereby dividing up the chamber formed in this manner into two part-chambers which alternately serve as pressure chamber and discharge chamber all according to which direction the rotor shall be rotated in, and the chambers communicating with ducts for the supply and discharge of oil, and wherein the motor comprises two rotors which are arranged end to end in a common bore, each having a shaft portion projecting outside the housing at the end which lies opposite to the other rotor, and feed and discharge channels being arranged in mutually opposed relationship relative to the blades of the two rotors, the arrangement being such that the one rotor can be made to rotate in the opposite direction to the direction of rotation of the other rotor by the supply of pressure medium for rotating the rotors.

In order that the invention may be more clearly understood, a convenient embodiment thereof will now be described with reference to the accompanying drawings in which:

FIG. 1 is a much simplified side view of the hatch cover sections, swung-up to give admission to a ship's loading hatch.

FIG. 2 is a section along the line II—II of FIG. 3.

FIG. 3 is a section on a larger scale through a hydraulic rotary motor according to the invention, arranged as a hatch hinge between two of the hatch cover sections according to FIG. 1.

FIG. 4 is a side view of the rotary hinge of FIG. 3.

Referring to FIG. 1, there is illustrated a ship's hatch opening 10 at one end of which there is secured on an elevated section 11 a hinge 12 supporting by means of its hinge pin 13 one end of a first hatch cover section 14. At its opposite end, cover section 14 is hinged by a hatch hinge 15 to a second hatch cover section 16 which in turn is further hinged at its opposite end to a hatch cover section 18 by a conventional hinge 17. Cover section 18 is also hinged by a hatch hinge 19 of the same kind as hatch hinge 15 to an outer cover section 20 which has a roller 21 at its non-hinged end which supports the cover section while rolling on the arm of the hatch. In the fully swung-up position, roller 21 runs up a short inclined plane 22.

The construction described above, in which the cover sections 14, 16, 18 and 20 fold up like an accordion and are stowed away together at one end of the hatch opening, is well known per se. Hydraulic control of the cover sections can be obtained by constructing the hatch hinges 15 and 19 as hydraulically controlled hinges.

In conventional oscillating hydraulic motors with radial blades, for example of the improved type illustrated and described in applicants' Norwegian Patent No. 97,525, however, it is always preferred to have a hydraulically counterbalanced rotor. In other words, it is always desirable, or even necessary, to have at least two blades, arranged diametrically opposite each other. By this means the pressure chambers of the motor will also be diametrically opposite to each other and the shaft of the rotor will be hydraulically counterbalanced against the radial forces.

However, this means that the conventional radial blade motors cannot be used, since the most they are able to rotate through is about 140°.

In a convenient embodiment of the invention an arrangement is used as illustrated in FIGS. 2, 3 and 4 in which a part of the hatch cover sections 14 and 16 is shown. A drive bracket 23 is secured by bolts (not shown) to the cover section 14, which receives in a square opening a correspondingly shaped shaft-projecting portion 24 on a rotor denoted generally by reference numeral 25. Rotor 25 is received in a sleeve-shaped housing 26. A bearing bracket 27 is secured to the section 16 at the same end of the housing 26 and constitutes bearings for a cylindrical portion 28 of the rotor 25. The construction of the remaining part of the rotor together with the housing 26 will be explained further later on in the description.

At the opposite end of the housing 26, a bracket 29 is secured with bolts (not shown) to the hatch cover section 16, and receives in a square opening a correspondingly shaped shaft-projecting portion 30 on a second rotor denoted generally by reference numeral 31. The second rotor 31 is also received in the housing 26 coaxially with respect to the first rotor 25, so that the two rotors are disposed end to end within the housing 26. A bearing bracket 32 is secured to the cover section 14 and constitutes bearing for a cylindrical portion 33 of the second rotor 31, which projects outside the housing at this end.

As will be apparent from FIG. 3, each rotor comprises a central core 34 which carries at each end one of a corresponding pair of bosses 35, 36. The bosses 35, 36 fit tightly against the cylindrical inner bore 37 of the housing 26. With reference to FIG. 2, two blades 38, 39 are secured diametrically opposed to each other on the core 34 and extend from the one boss 35 to the other boss 36. In the embodiment shown the blades 38, 39 consist of flat steel pieces of rectangular cross-section, which are sunk down into axially extending channels 40 in the core 34, as well as into radial portions in the bosses 35, 36. In the surface which is directed towards the wall of the inner bore of the housing there is located an axially extending packing cord 41 in a recess in each blade. Furthermore, bores 42 extend from the one side face on the one blade to the diametrically opposite side face on the other blade. Only one such bore is shown in full lines in the drawing, a corresponding bore being indicated by dotted lines at 43 in FIG. 2. Partition forming blocks 44, 45 are also included in the housing 26 and they are arranged diametrically opposite to each other in the inner bore of the housing, being secured to this by bolts 46 (see FIG. 3), in the same way as in illustrated and described in applicants' Norwegian Patent No. 97,525. A packing cord 47 is arranged in a recess in the outer face of each block for sealing against the core 34 of the rotor, as well as against the inner faces of the bosses 35, 36.

On looking at FIG. 2 it will be apparent that between a first block 44 and a first blade 38 there is formed a chamber 48A, which corresponds to a chamber 48B which lies between the second block 45 and the second blade 39. The two chambers 48A and 48B are connected to each other by one or more bores 42, so that both are fed pressure oil at the same time. Furthermore, it will be evident that the supply of pressure oil to these chambers 48A and 48B will cause the first rotor 25 to rotate in a clockwise direction.

In a corresponding manner there is formed between the first block 44 and the second blade 39 a chamber 49A, which corresponds to a chamber 49B which lies between the second block 45 and the first blade 38. The two chambers 49A and 49B are connected together by one or more bores corresponding to the bore 42, which, however, have been left out on the drawing for the sake of clarity. When the chambers 49A and 49B are supplied with pressure oil, the chambers 48A and 48B are connected with the discharge, the supply of pressure oil to the chambers 49A and 49B causing the rotor 25 to rotate in a counterclockwise direction.

In a corresponding way the second rotor has blocks 50, 51 and blades 52, 53 which correspond to the blocks 44, 45 and the blades 38, 39 for the first rotor and they form a first group of chambers 54A and 54B and a second group of chambers 55A and 55B. The first group of chambers 54A and 54B receive pressure oil for rotating this rotor in a clockwise direction, while the second group of chambers 55A and 55B receive pressure oil for rotating the second rotor in a counterclockwise direction. In order to simplify control the blocks 44 and 50 are coaxially arranged relative to each other, just as blocks 45 and 51 are also arranged coaxially with respect to each other.

The chamber group 48A and 48B, which receives pressure oil when the first rotor is to be rotated in a clockwise direction, is connected by a conduit 56 with the chamber group 55A and 55B, which receives pressure oil when the second rotor is to be rotated in a counterclockwise direction. In the same way the chamber group 49A and 49B, which receives pressure oil when the first rotor is to be rotated in a counterclockwise direction, is connected by a conduit 57 with the chamber group 54A and 54B, which receives pressure oil when the second rotor 31 is to be rotated in the clockwise direction. From this it is clear that the one rotor 25 rotates in the opposite direction to the second rotor 31, when pressure oil is supplied through the one or the other by two main feed conduits 58, 59, which are led in through the projecting portion 24 on the first rotor 25, and through suitable bores in the core of the rotor into their chamber groups 48A, 48B and 49A, 49B respectively.

It will be observed that oil is supplied to and withdrawn from the oscillating motor through the projecting portion 24 for the one rotor 25 and in the opposite direction to the construction of Norwegian Patent No. 97,525, wherein the oil is fed through the bores in the housing. In the present construction however the rotor 25 will be stationary relative to the hatch cover section 14, and it will only be necessary to have a conduit for pressure oil from the deck to the permanent conduits in or on the hatch section 14, which is flexible or rotatable at the hinge pins 13 and 17.

On each of the inner bosses 36 there are arranged two gasket rings for sealing. On each of the two outer bosses 35 and immediately adjacent the core 34 are arranged two gasket rings 61, also for sealing. Proceeding outwardly on the boss 35 from the gasket rings 61 are in turn a draining channel 62, another gasket ring 63, a further draining channel 64 and an outer gasket ring 65. From the draining channels 62, 64 on the second rotor 31 and also from the intermediate space at 66 between the two rotors 25 and 31, run draining conduits 67 and 67A over to the draining channels on the first rotor 25, and from there ducts 68, 68A run out to draining conduits 69, 69A which extend back to the discharge side of the hydraulic system for control of the hatch covers.

Finally there are located on the bearing brackets 27 and 32 felt joints 70, which prevent lubricant for the bearings of the two rotors from leaking out.

In FIG. 4 it is also shown how sealing between two hatch cover sections is obtained when they are positioned over the hatch opening. To the one section 16 an angle piece 71 is welded which terminates in a head 72. The other section 14 supports a second angle piece 73 which receives a gasket 74. When the head 72 presses against the gasket 74 sealing is obtained and at the same time the angle piece 71 forms a drain for water which must make its way down through the gap at 75 between the two hatch cover sections.

On looking at FIGS. 3 and 4, it will be apparent that if the hatch cover 14 is considered stationary, rotor 25 will also be stationary. The supply of pressure medium for rotating rotor 25 in a clockwise direction will instead cause the whole housing 26 to rotate correspondingly in a counterclockwise direction, the housing not being rigidly connected with any of the other parts of the rotating hinge. This rotation will take the rotor 31 with it through a corresponding angle, but at the same time the pressure chambers of rotor 31 are fed pressure oil for rotation in a counterclockwise direction. Rotor 31 will therefore be rotated relative to the housing through an exactly corresponding angle, but it follows that the projecting portion 30 on this rotor will rotate through an angle just double the rotation of the housing 26. Since the possible rotation for a rotor is about 140°, it will be possible in other words to rotate the projecting portion 30 through 280° relative to the projecting portion 24.

Referring once again to FIG. 1, the supply of pressure medium for rotating the hatch covers to the two rotary motors which constitute the hatch hinges 15 and 19 will cause the covers to be raised up, so to speak, by themselves, while the outermost section 20 will rest on its roller 21 on the edge of the hatch. When roller 21 rolls on the hatch edge, the hatch cover sections will be transferred from their resting positions at which they cover the hatch (not shown) to their raised positions of FIG. 1.

A high lifting force can be obtained by means of the hatch hinges of the invention, not the least because the pressure from the hydraulic medium operates against completely radial surfaces which can have quite large dimensions. In order to obtain a definite lifting force only low pressure is required.

The invention can be modified in several ways. Thus there is nothing to prevent the hydraulically controlled hatch hinges from being located instead at hinge pin 13 and hinge 17 respectively. In this case the hatch hinge 17 need only be of the kind described herein.

It is preferred to have one or two such hydraulically controlled hatch cover motors for each of the hinges 15 and 19. However, more can also be used.

If desired, for example when especially high lifting forces are needed but with small radial dimensions for the rotary motor, the rotors can be provided with three blades arranged symmetrically at an angle of 120° relative to one another. Even with such a construction rotating angles of 180° can be achieved, that is to say ⅔ of the aforementioned 280° which is obtained with the construction described herein.

Further it should be noted that there is nothing to prevent the rotors being constructed with different lengths.

It will be evident from the drawings that it is very simple to produce oscillating motors according to the invention having arbitrary lengths. As will be appreciated, the housing is formed of a uniformly thick tube and only the rotors require remodelling. This means that the housing can be produced quite simply by cutting off a suitable length of tube manufactured beforehand in which are drilled the desired holes for bolts, conduits and the like. It is hence not necessary to make the housing of a casting as in previous known constructions.

What I claim is:

1. Hydraulically controlled hatch hinge, especially for ships', hatches and of the kind in which two cover sections are linked together by an oscillating fluid controlled motor whose rotation causes the one section to pivot about the hinge relative to the other section, a housing having its end portions rotatably disposed between pairs of opposed complementary brackets, one of each of said pairs of brackets being connected to one cover section and the other of said pairs of brackets being connected to the other cover section, and a pair of axially aligned rotors rotatably supported within said housing, each of said rotors having their respective end portions disposed in bearing relationship to the wall of said housing, means connecting the one section to a first rotor, and means connecting the other section to a second rotor, the two rotors being axially immovably received but radially rotatable, each relative to its respective part of the housing which parts are fixedly connected to each other and arranged so as to be rotatable relative to both the two sections, and means for applying a rotary force to said rotors.

2. Fluid controlled hatch hinges for hingedly connecting a pair of panel sections, each of said panel sections having a pair of spaced apart brackets connected thereto, one of said brackets of each pair forming a bearing bracket and the other of said brackets of each pair forming a drive bracket, the bearing bracket of one of said sections being complementary to the drive bracket of the other said sections, a fluid controlled motor secured between the complementary pairs of brackets, said motor including a housing rotatably journalled between the drive bracket of one panel section and the complementary bearing bracket of the other panel section, a pair of rotors mounted in axial alignment within said housing for relative rotation thereto, said rotors being mounted for relative rotation relative to one another, means fixedly connecting one of said rotors to the bearing bracket of said other panel section and for fixedly connecting the other rotor to the drive bracket of said one panel, and means for effecting relative rotation of said rotors within said housing simultaneously but in opposite direction to effect relative rotation of the respective panel sections connected in driving relationship to said rotors.

3. The invention as defined in claim 2 wherein each of said rotors include radially directed blades which are received in their respective chambers defined by separating walls extending inwardly from the bore of the housing toward the respective shafts of said rotors, each blade thereby dividing up the chamber formed in this manner into two part chambers which alternately serve as pressure chambers and discharge chamber all according to which direction the rotor shall be rotated in and the chambers communicating with ducts for the supply and discharge of oil, the ducts extending from each of the radial surfaces of the blade over to the diametrically opposed radial surface on the other blade, and an external conduit leading from one radial surface on the separating wall cooperating with each of the respective rotors to the opposite radial face of the corresponding separating wall of the respective rotors.

4. An oscillating piston fluid motor, of the kind in which a rotor is rotatably mounted in a bore in a housing and has radially directed blades which are each received in their respective chambers defined by separating walls extending from the inner wall of the bore and inwards to the core of the shaft of the rotor, each blade thereby dividing up the chamber formed in this manner into two part chambers which alternately serve as pressure chamber and discharge chamber all according to which direction the rotor shall be rotated in and the chambers communicating with ducts for the supply and discharge of oil, and wherein the motor comprises two rotors which are arranged end-to-end in a common bore, each having a shaft portion projecting outside of the housing at the end which lies opposite to the other rotor, and feed and discharge channels being arranged in mutually opposed relationship relative to the blades of the two rotors, the arrangement being such that the one rotor can be made to rotate in the opposite direction to the direction of rotation of the other rotor by the supply of pressure medium for rotating the rotors, wherein each rotor has two diametrically opposed blades and the separating walls of the rotors lie in the same radial plane, the ducts extending from each of the radial surfaces of the blades over to the diametrically opposed radial surface on the other blade, and an external conduit leading from the one radial face on the separating wall for the one rotor to the opposite radial face on the corresponding separating wall for the other rotor.

5. A pair of cover sections, an oscillating fluid controlled motor hingedly connecting said sections together, said motor being of the kind in which a rotor is rotatably mounted in a bore in a housing and in bearing relationship to the wall of said bore, said rotor having radially directed blades which are each received in their respective chambers defined by separating walls extending from the inner wall of the bore and inwards to the core of the shaft of the rotor, each blade thereby dividing up the chamber formed in this manner into two part-chambers which alternately serve as pressure chamber and discharge chamber all according to which direction the rotor shall be rotated in and the chambers communicating with ducts for the supply and discharge of oil, and wherein the motor comprises two rotors which are arranged end to end in a common bore, each of said rotors being independently mounted within said housing common thereto and each of said rotor having a respective shaft portion projecting outside the housing at the end which lies opposite to the other rotor, and feed and discharge channels being arranged in mutually opposed relationship relative to the respective blades of each of said two rotors, the arrangement being such that the one rotor can be made to rotate in the opposite direction to the direction of rotation of the other rotor by the supply of pressure medium for rotating the rotors, and means including opposed pairs of brackets connecting said motor to and between said cover sections, one of each of said pairs of brackets being drivingly connected to one of said rotors and the other one of each of said pairs of brackets forming a bearing for the other of said rotor.

6. Oscillating motor, according to claim 5, wherein the housing is constructed as a tube of uniform thickness, whilst each rotor has a portion which projects outside the respective end of the housing and which is adapted to form a mounting for the motor to the respective sections.

7. Oscillating motor according to claim 5, wherein the one rotor has ducts in its shaft-projecting portion for the supply of pressure oil and the withdrawal of discharge oil to position adjacent the blades of the rotor.

References Cited by the Examiner
UNITED STATES PATENTS

| | | | |
|---|---|---|---|
| 103,212 | 5/1870 | Long | 123—18 |
| 2,770,297 | 11/1956 | Mercier et al. | 160—188 |
| 2,855,038 | 10/1958 | Greer | 160—188 |
| 2,930,445 | 3/1960 | Englesson | 160—188 |
| 3,056,386 | 10/1962 | Aarvold et al. | 160—188 X |
| 3,196,934 | 7/1965 | Sneen | 160—188 X |

HARRISON R. MOSELEY, *Primary Examiner.*

RICHARD B. WILKINSON, *Examiner.*

H. G. SHIELDS, P. M. CAUN, *Assistant Examiners.*